United States Patent [19]

Ellenberger et al.

[11] 4,261,882

[45] Apr. 14, 1981

[54] METHOD FOR THE HYDROLYSIS OF MILK PROTEIN

[75] Inventors: Willi Ellenberger, Sandmoorweg 34a, 2000 Hamburg, Fed. Rep. of Germany; Holger Blum, Hamburg, Fed. Rep. of Germany; Harald Müller-Zitzke; Ludwig Mascher, Jr., both of Bodenfelde, Fed. Rep. of Germany

[73] Assignee: Willi Ellenberger, Hamburg, Fed. Rep. of Germany

[21] Appl. No.: 76,182

[22] Filed: Sep. 17, 1979

Related U.S. Application Data

[63] Continuation-in-part of Ser. No. 930,215, Aug. 2, 1978, Pat. No. 4,181,651.

[30] Foreign Application Priority Data

Sep. 18, 1978 [DE] Fed. Rep. of Germany ....... 2840592

[51] Int. Cl.$^3$ ........................... A23J 1/20; C07G 7/00
[52] U.S. Cl. ................................ 260/112 R; 260/121
[58] Field of Search ................... 260/119, 120, 112 R, 260/121

[56] References Cited

U.S. PATENT DOCUMENTS 4,181,651   1/1980   Ellenberger et al. ................ 260/119

*Primary Examiner*—Howard E. Schain
*Attorney, Agent, or Firm*—Burgess, Ryan and Wayne

[57] ABSTRACT

The invention relates to a method for the hydrolysis of milk protein using non-oxidising mineral acids at elevated temperatures, at which hydrolysis is performed in the presence of orthophosphorous acid and/or its salts and also of acid-activated montmorillonite to inhibit discoloration at temperatures of 60°–100° C. The method in accordance with the invention is technically simple and can be undertaken economically and it supplies the desired protein hydrolysate with high yield without the formation of undesirable by-products, especially undesirable dark substances, which result in discoloration of the end product.

8 Claims, No Drawings

METHOD FOR THE HYDROLYSIS OF MILK PROTEIN

This application is a continuation-in-part of our copending application Ser. No. 930,215, filed Aug. 2, 1978, now U.S. Pat. No. 4,181,651.

The invention relates to a method for the hydrolysis of milk protein selected from the group consisting of albumin, globulin and casein.

During the hydrolysis of casein at elevated temperature when using non-oxidising mineral acids, apart from the desired protein hydrolysates, soluble and insoluble dark substances are also formed as by-products, which not only cause a deterioration in the purity and quality, but also the yield of protein hydrolysate. Admittedly it is possible, by reducing the reaction temperature during the hydrolysis of casein, to partially or completely prevent the formation of the undesirable dark substances, but as a result the reaction period is increased to values which are no longer acceptable. Attempts have already been made to produce uncoloured or only slightly coloured protein hydrolysates by undertaking the hydrolysis of casein at elevated temperatures using a non-oxidising mineral acid in the presence of sulphurdioxide or urea. However these methods have also proved inadequate to completely prevent the formation of the undesirable dark substances. Furthermore, during this considerable quantities of new extraneous substances are formed such as ammonium sulphate, which in turn considerably reduce the quality of the protein hydrolysate for the foodstuffs or fodder sector.

Hence the aim of the invention is to develop a method by means of which it is possible, in a technically simple and yet effective way, to so hydrolyse milk protein using non-oxidising mineral acids at elevated temperatures so that no indesirable by-products are encountered, and particularly no discoloration.

It has been found that this task can be solved in one method for the hydrolysis of milk protein using non-oxidising mineral acids at elevated temperatures by undertaking the hydrolysis in the presence of orthophosphorous acid and/or its salts, also in the presence of acid-activated montmorillonite to inhibit discoloration at temperatures of 60°–100° C.

The method in accordance with the invention is technically simple and economic to carry out and it supplies the desired protein hydrolysate with high yield without the formation of undesirable by-products, especially undesireable dark substances, which result in discoloration of the end product.

In the procedure, in accordance with the invention, the nonoxidising mineral acids employed for the hydrolysis of milk protein are the aqueous mineral acids usually employed, especially hydrochloric acid and/or sulphuric acid, with arbitrary concentration, but preferably in a concentration of up to roughly 20% by weight.

Hydrolysis is performed in accordance with the invention at a temperature of 60°–100° C., preferably from 80° to 95° C.

The orthophosphorous acid $H_3PO_3$ which is used as one of the additives in accordance with the invention can be added in arbitrary amounts, preferably in a quantity of up to 15% by weight, especially in a quantity of 0.1–10% by weight, and specially in a quantity of 0.2–2% by weight, all related to the content of non-oxidising mineral acid.

The free orthophosphorous acid used in accordance with the invention can be completely or partially replaced by one or more of its soluble salts, the amount used corresponding to the free acid. In accordance with the invention, the soluble salts employed can be the alkali and/or earth alkali salts and/or the ammonium salt of this acid. Particularly suitable salts of orthophosphorous acid are the potassium, sodium, barium and ammonium salts. Preferably however, the free orthophosphorous acid is used.

In the method in accordance with the invention, apart from orthophosphorous acid, acid-activated montmorillonite is used as a further additive. By montmorillonite is meant here an aluminum hydrosilicate which is found as a mineral with the approximate formula $Al_2O_3.4SiO_2 \cdot H_2O + xH_2O$ which is characterised by a crypto-crystalline three-layer structure which consists of two-dimensional infinite macro-anions which are electrostatically cross-linked via the cations of an intermediate layer.

Such an acid-activated montmorillonite can also be produced artificially, as described for example in German Pat. Specification No. 1 211 643. The acid-activated montmorillonite used in accordance with the invention can be obtained on the open market, for example under the trade name "K-Katalysatoren" from the Girdler-Südchemie Katalysator GmbH.

The acid-activated montmorillonite can be employed in arbitrary quantities, preferably 0.1–10% by weight, especially from 1–3% by weight, in each case related to the content of non-oxidising mineral acid.

When performing the procedure in accordance with the invention, the ratio between non-oxidising mineral acid and amino nitrogen in the milk protein is kept within the range within which it is normally maintained during protein hydrolysis. The quantitative ratio normally employed is about 1 up to about 4 gramme equivalents of mineral acid per gramme atom amino nitrogen in the milk protein. If hydrolysis is to be performed under conditions of extreme care, then about 1.5 up to about 2 gramme equivalents of mineral acid are used per gramme atom of amino nitrogen in the milk protein and the reaction temperature is between 60° and 100° C. However, in order to shorten the reaction period, it is also possible to use 2.5–4 gramme equivalents of mineral acid per gramme atom of amino nitrogen in the milk protein. A typical reaction batch for use in the procedure in accordance with the invention has the following composition:

casein in an amount which contains 1 gramme atom of aminonitrogen, 1.5–4 gramme equivalents of non-oxidising mineral acid in the form of an aqueous solution, 0.1–10 parts by weight of orthophosphorous acid and/or its salt, used for 100 parts by weight of the non-oxidising mineral acid employed.

0.1–10 parts by weight of acid activated montmorillonite used with 100 parts by weight of the non-oxidising mineral acid employed.

The reaction batch specified above, or a fraction or a multiple thereof, is made to react by heating for several hours up to the highest possible degree of hydrolyses, preferably up to a hydrolysis level of 75 to 99%, especially up to an hydrolysis level of 90–99% of the casein and after cooling down it is filtered with the aid of active carbon, this giving the desired product.

The invention will now be illustrated by the following examples.

EXAMPLE 1

Several reaction batches consisting of commercially available casein with a dry solids content of 34.6% by weight and 20% by weight hydrochloric acid are hydrolysed at 95° C. up to a hydrolysis level of 90%. 2.5 gramme equivalents of hydrochloric acid are used per gramme atom of amino nitrogen in the casein.

Except for a blank test, the reaction batches contain the amounts of orthophosphorous acid and of an commercially available acid activated montmorillonite (Catalyst KSF) as specified in table I which follows. After cooling down, the reaction mixture is stirred together with 0.4% by weight of active carbon and is filtered.

Then the residual colour of the reaction mixture obtained after filtration is established, related to the blank test specimen which is free from additive materials, as a criterion for the quantity of dark substances contained therein which have formed under the hydrolysis conditions.

TABLE I

| Reaction batch No. | Parts by weight of $H_3PO_3$ to 100 parts by weight of HCl | Parts by weight of acid activated montmorillonite to 100 parts by weight of HCl | Hydrolysis level (%) | Residual colour (%) |
|---|---|---|---|---|
| 1 | 0 | 0 | 90 | 100 |
| 2 | 3 | 0 | 90 | 95 |
| 3 | 0 | 3 | 90 | 80 |
| 4 | 1 | 2 | 90 | 50 |
| 5 | 2 | 1 | 90 | 45 |
| 6 | 0.5 | 3 | 90 | 40 |

EXAMPLE 2

The same commercially available casein as in example 1 is hydrolysed up to 90% level using 20% by weight of sulphuric acid at 80° C. 2.5 gramme equivalents of sulphuric acid are used per gramme atom of amino nitrogen in casein. The reaction batches contain the quantities of orthophosphorous acid and acid activated montmorillonite (KSF catalyst) as specified in Table II which follows.

After cooling, the reaction batches are stirred together with 0.3% by weight of active carbon and filtered and the residual colour of the resultant reaction product is determined as in example 1.

TABLE II

| Reaction batch No. | Parts by weight $H_3PO_3$ to 100 parts by weight of $H_2SO_4$ | Parts by weight of acid activated montmorillonite to 100 parts by weight of $H_2SO_4$ | Hydrolysis level (%) | Residual colour (%) |
|---|---|---|---|---|
| 7 | 0 | 0 | 90 | 100 |
| 8 | 3 | 0 | 90 | 91 |
| 9 | 0 | 3 | 90 | 88 |
| 10 | 1 | 2 | 90 | 35 |
| 11 | 2 | 1 | 90 | 30 |
| 12 | 0.2 | 1.5 | 90 | 40 |

EXAMPLE 3

Several reaction batches consisting of commercially available lactalbumin/globulin-mixture with a dry solids content of 38% by weight and 20% by weight hydrochloric acid are hydrolised at 95° C. up to a hydrolysis level of 90%. 2.5 gramme equivalents of hydrochloric acid are used per gramme atom of amino nitrogen in the lactalbumin/globulin-mixture.

Except for a blank test, the reaction batches contain the amounts of orthophosphorous acid and a commercially available acid activated montmorillonite (catalyst KSF) as specified in table III which follows. After cooling down, the reaction mixture is stirred together with 0.6% by weight of active carbon and is filtered.

Then the residual colour of the reaction mixture obtained after filtration is established, related to the blank test specimen which is free from additive materials, as a criterium for the quantity of dark substances contained therein which have formed under the hydrolysis conditions.

TABLE III

| Reaction batch No. | Parts by weight $H_3PO_3$ to 100 parts by weight of HCl | Parts by weight of acid activated montmorillonite to 100 parts by weight of HCl | Hydrolysis level (%) | Residual colour (%) |
|---|---|---|---|---|
| 1 | 0 | 0 | 90 | 100 |
| 2 | 3 | 0 | 90 | 100 |
| 3 | 0 | 3 | 90 | 95 |
| 4 | 1 | 2 | 90 | 66 |
| 5 | 2 | 1 | 90 | 54 |
| 6 | 2 | 3 | 90 | 52 |

EXAMPLE 4

The same commercially available lactlabumin/globulin-mixture as in example 3 is hydrolised up to 90% level using 20% by weight of sulphuric acid at 90° C. 2.5 gramme equivalents of sulphuric acid are used per gramme atom of amino nitrogen in the lactalbumin/globulin-mixture. The reaction batches contain the quantities of orthophosphorous acid and acid activated montmorillonite (KSF catalyst) as specified in tabe IV which follows.

After cooling, the reaction batches are stirred together with 0.6% by weight of active carbon and filtered and the residual colour of the resulting reaction product is determined as in example 3.

TABLE IV

| Reaction batch No. | Parts by weight $H_3PO_3$ to 100 parts by weight of $H_2SO_4$ | Parts by weight of acid activated montmorillonite to 100 parts by weight of $H_2SO_4$ | Hydrolysis level (%) | Residual colour (%) |
|---|---|---|---|---|
| 7 | 0 | 0 | 90 | 100 |
| 8 | 3 | 0 | 90 | 100 |
| 9 | 0 | 3 | 90 | 92 |
| 10 | 1 | 2 | 90 | 61 |
| 11 | 2 | 1 | 90 | 50 |
| 12 | 4 | 1.5 | 90 | 48 |

EXAMPLE 5

Several reaction batches consisting of lactalbumin which was present in a mixture of the α- and β-form was hydrolised with 20% by weight hydrochloric acid up to a hydrolysis level of 94% at 95° C. 3 gramme equivalent hydrochloric acid are used per gramme atom of amino nitrogen in the protein. Before the residual colour was determined, the reaction batches were stirred with 0.5% by weight active carbon and filtered. The results of tests are shown in the following table V.

TABLE V

| Reaction batch no. | Parts by weight of H₃PO₃ to 100 parts by weight of HCl | Parts by weight "cat.KSF" to 100 parts by weight of HCl | Hydrolysis level (%) | Residual colour (%) |
|---|---|---|---|---|
| 13 | 0 | 0 | 94 | 100 |
| 14 | 0 | 2 | 94 | 85 |
| 15 | 1.5 | 0 | 94 | 85 |
| 16 | 1.5 | 2 | 94 | 40 |

EXAMPLE 6

The reaction batch no. 16 was repeated according to the method described in example 5 using lactoglobulin as a starting product of protein. The residual colour amounts to 45% in this reaction batch as compared to 100% when the lactoglobulin was subjected to the conditions of reaction batch 13 according to example 5.

We claim:

1. A method for the hydrolysis of milk protein selected from the group consisting of albumin, globulin and mixtures thereof which method comprises contacting said milk protein with from about one to four gram equivalents of non-oxidizing mineral acid per gram atom of amino nitrogen in the milk protein at a temperature from 60° to 100° C. in the presence of acid activated montmorillonite and a member selected from the group consisting of orthophosphorous acid, salts of orthophosphorous acid and mixtures thereof.

2. The method in accordance with claim 1, wherein the non-oxidising mineral acid is selected from the group consisting of aqueous hydrochloric acid, aqueous sulphuric acid and mixtures thereof.

3. A method in accordance with claim 3 characterised by the use of the sodium, potassium, barium and/or ammonium salts as salts of the orthophosphorous acid.

4. A method in accordance with any one of claims 1, 2 or 3, characterised by the use of orthophosphorous acid and/or its salts in a quantity of up to 15% by weight related to the amount of non-oxidising mineral acid.

5. A method in accordance with claim 4, characterized by the use of orthophosphorous acid and/or its salts in an amount of 0.1 to 10% by weight related to the amount of non-oxidising mineral acid.

6. A method in accordance with claim 5, comprising the use of orthophosphorous acid or a salt thereof in an amount of 0.2 to 2% by weight based on the amount of non-oxidizing mineral acid.

7. A method according to claim 6 wherein acid-activated montmorillonite is present in an amount of 0.1 to 10% by weight of the non-oxidizing mineral acid.

8. A method according to claim 7 wherein the acid-activated montmorillonite is present in an amount of 1 to 3% by weight of the non-oxidizing mineral acid.